(12) United States Patent
Bowen

(10) Patent No.: US 8,646,521 B2
(45) Date of Patent: Feb. 11, 2014

(54) METHOD AND APPARATUS FOR CLEANING A DRILL STRING

(75) Inventor: Adrian Bowen, South Wales (GB)

(73) Assignee: Adrian Bowen, South Wales (GB)

( * ) Notice: Subject to any disclaimer, the term of this patent is extended or adjusted under 35 U.S.C. 154(b) by 594 days.

(21) Appl. No.: 12/933,554

(22) PCT Filed: Mar. 23, 2009

(86) PCT No.: PCT/GB2009/050265
§ 371 (c)(1),
(2), (4) Date: Sep. 20, 2010

(87) PCT Pub. No.: WO2009/118549
PCT Pub. Date: Oct. 1, 2009

(65) Prior Publication Data
US 2011/0005011 A1    Jan. 13, 2011

(30) Foreign Application Priority Data

Mar. 25, 2008 (GB) .................................. 0805322.5

(51) Int. Cl.
*E21B 33/068* (2006.01)
*E21B 12/06* (2006.01)

(52) U.S. Cl.
USPC .......................................... 166/82.1; 166/70

(58) Field of Classification Search
USPC ............................................ 166/69, 70, 82.1
See application file for complete search history.

(56) References Cited

U.S. PATENT DOCUMENTS

| 1,763,642 | A | * | 6/1930 | Dievendorff et al. ........... 166/70 |
|---|---|---|---|---|
| 3,216,500 | A | | 11/1965 | Diehl |
| 3,863,716 | A | | 2/1975 | Streich |
| 4,199,834 | A | | 4/1980 | Muchow et al. |
| 4,580,635 | A | | 4/1986 | Radford et al. |
| 4,600,444 | A | | 7/1986 | Miner |
| 4,896,720 | A | | 1/1990 | DeRouen |
| 5,186,757 | A | | 2/1993 | Abney, Sr. |
| 5,208,937 | A | | 5/1993 | Cooper |
| 6,158,074 | A | | 12/2000 | Castille |
| 6,286,540 | B1 | | 9/2001 | Bonicontro |
| 2000/3141052 | | | 7/2003 | Pedersen et al. |

FOREIGN PATENT DOCUMENTS

| FR | 2612092 A1 | 9/1988 |
|---|---|---|
| JP | 03202185 A | 9/1991 |
| JP | 2003001210 A | 6/2010 |
| WO | 2005108738 A1 | 11/2005 |

* cited by examiner

*Primary Examiner* — Brad Harcourt
(74) *Attorney, Agent, or Firm* — The Ollila Law Group LLC

(57) ABSTRACT

An apparatus for use in cleaning a drill string comprises a body portion (10) having a tubular side wall and a resiliently compressible cleaning member (11) mounted inside the hollow interior thereof under compression, the body portion (10) comprising an open lower end adapted to engage the drill string. A separate actuator (13) is provided for fitting to the body portion (10) for displacing the cleaning member (11) out of the tubular side wall of the body portion (10) into the drill string. In use, the cleaning member (11) can be loaded into the body portion (10) at a remote location prior to the cleaning operation thereby reducing the time taken to insert the cleaning member (11) into the drill string and alleviating the risk of injury.

6 Claims, 1 Drawing Sheet

METHOD AND APPARATUS FOR CLEANING A DRILL STRING

This invention relates to a method and apparatus for use in cleaning a drill string.

It is often necessary to pump cement into an oil well or field. Typically, this is achieved by pumping the cement down a tubular drill string extending from an oil or drilling rig. Once completed, the residual cement can leave a coating of cement inside the drill string which can block or severely restrict the drill string if allowed to set.

In order to overcome this problem, it is well known to clean the drill string after the cement pumping operation by inserting a ball of foamed plastics material into the upper end of the drill string and applying a pressurised fluid behind the ball, which forces the ball along the drill string thereby cleaning the internal side walls thereof.

The foamed plastics material of the ball is extremely resilient and the ball comprises a diameter of 20 cm, which is approximately double that of the internal diameter of the drill string into which the ball has to be fitted. Accordingly, it will be appreciated that the ball has to be substantially compressed to fit into the drill string. Hitherto, this process has been carried out by personnel forcing the ball into the upper end of the drill string by hand. A disadvantage of this is that the ball is so difficult to compress that it can take up to 30 minutes to get the ball fully into the drill string, during which time the drill string cannot be used for other operations: this has a severe financial impact on oil companies since wasted time costs a considerable amount of money. Another disadvantage of inserting the ball by hand is that it is relatively easy for personnel to trap their fingers or otherwise injure themselves during the process.

I have now devised an apparatus for use in cleaning a drill string which alleviates the above-mentioned problems.

In accordance with the present invention, there is provided an apparatus for use in cleaning a drill string, the apparatus comprising a body portion having a tubular side wall and a resiliently compressible cleaning member mounted inside the hollow interior thereof under compression, the body portion comprising an open lower end adapted to engage the drill string.

In use, the cleaning member can be loaded into the body portion at a remote location prior to the cleaning operation. Accordingly, personnel merely have to engage the body portion with the drill string, so that the cleaning member can then be quickly ejected out of the body portion into the drill string. Following use, the body portion can be removed from the drill string, so that normal operations can continue straight away. Another cleaning member can then be fitted into the body portion at a remote location for future use.

Preferably the cleaning member has a diameter which is at least 10% greater than the internal diameter of the tubular sidewall.

The cleaning member may be spherical, ovoid or cylindrical in shape.

Preferably the lower end of the tubular sidewall of the body portion comprises an external diameter which is adapted to be less than the internal diameter of the drill string to which the body portion is to be fitted, such that personnel merely have to insert the lower end of the body portion into the drill string before ejecting the cleaning member out of the body portion into the drill string.

The upper end of the body portion is preferably open to allow the cleaning member to be pushed out of its lower end.

Preferably the apparatus comprises an actuator portion, which can be actuated to push the cleaning member out of the body portion.

Preferably the actuator portion comprises an actuator member which can be axially displaced along the interior of the body portion from its upper end.

Preferably the actuator portion comprises a handle which can be moved to displace the actuator member inside the body portion.

Preferably the handle is connected to the actuator member via a torque multiplier.

The handle may comprise a rotary handle, preferably mounted for rotation about the longitudinal axial of the body portion at the upper end thereof.

Alternatively, the handle may be mounted for linear movement, preferably in a direction which extends axially of the body portion.

Preferably the actuator portion is mounted to the upper end of the body portion and is preferably detachable therefrom: this facilitates reloading of another cleaning member and also helps to reduce the transportation costs of the apparatus to a location where reloading is performed. Furthermore, since more than one cleaning operation may need to be performed in a short time scale, it is preferable to carry a plurality of the aforementioned body portions of the apparatus. Accordingly, the provision of a detachable actuator portion saves substantial costs, since only a single actuator needs to be provided for fitting to a plurality of body portions of the apparatus.

Preferably a projection is provided on the external surface of the sidewall of the body portion for engaging the upper end of the drill string, so as to position the body portion and to prevent over insertion into the drill string.

Preferably the projection comprises an annular collar which extends circumferentially of the body portion.

Also in accordance with the present invention, there is provided a kit of parts comprising a plurality of body portions as hereinbefore defined and a single actuator portion for selectively fitting to the body portions for use in ejecting the cleaning members out of the lower end thereof.

Also in accordance with the present invention, there is provided a method of cleaning a drill string, the method comprising providing an apparatus comprising a body portion having a tubular side wall and a resiliently compressible cleaning member mounted inside the hollow interior thereof under compression, engaging the lower end of the body portion with the drill string and ejecting the ball out of the tubular side wall into the drill string.

Preferably the lower end of the tubular side wall of the body portion is fitted inside the upper end of the drill string.

Preferably the cleaning member is resiliently compressed into the tubular side wall of the body portion at a location remote from the drill string.

Preferably the cleaning member is ejected from the tubular side wall of the body portion into the drill string by actuating a handle or other manually-engagable operating member.

Preferably the handle or other member is provided on an actuator portion which is fitted to the body portion prior to ejecting the ball out of the tubular side wall of the body portion into the drill string.

Preferably the actuator portion is detached from the body portion after the cleaning member has been ejected from the tubular side wall of the body portion into the drill string.

An embodiment of the present invention will now be described by way of an example only and with reference to the accompanying drawings, in which.

Figure 1:
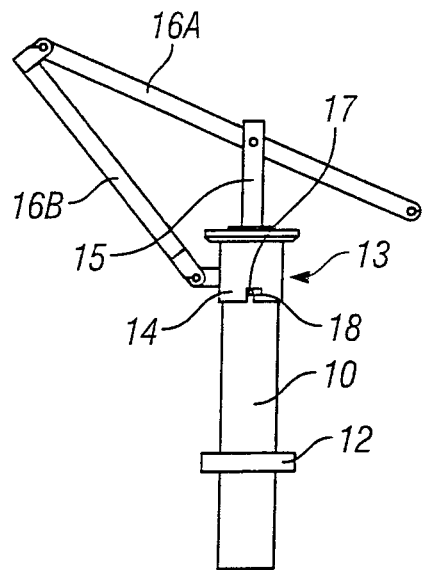
FIG. 1 is a side view of an apparatus in accordance with the present invention for use in cleaning a drill string.
Figure 2:
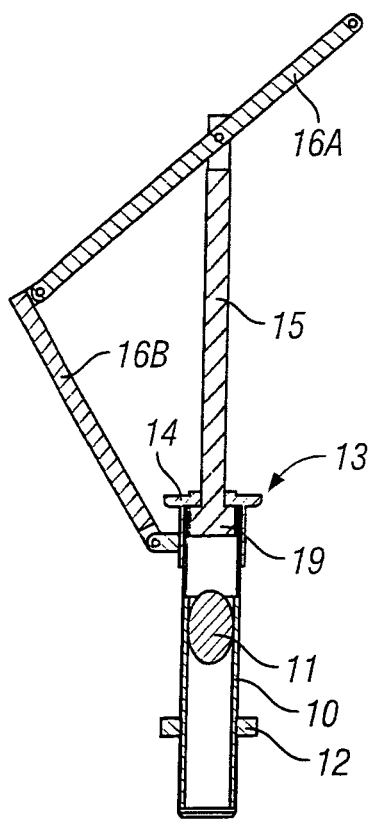
FIG. 2 is a longitudinal sectional view through the apparatus of FIG. 1.

Referring to FIGS. 1 and 2 of the drawings, there is shown an apparatus for use in cleaning a drill string, the apparatus comprising an elongate tubular body portion 10 formed of a lightweight yet durable material, such as aluminium or nylon. A spherical cleaning ball 11 of foamed plastics material is disposed inside the tubular body 10 intermediate opposite ends thereof. The ball 11 has a diameter of approximately double the internal diameter of the tubular body 10 and hence the ball 11 is held inside the body 10 in a compressed condition. The ball 11 can be inserted into the body 11 by hand at a remote location, where the time taken for insertion does not interrupt the operation of the drilling rig. Alternatively, the ball can be inserted into the body 10 at a remote location using a device which compresses the ball to the correct diameter.

The external diameter of the lower end of the tubular body 10 is reduced. An annular collar 12 extends around the lower end of the tubular body 10 at the point where the diameter thereof increases. An actuator portion of the apparatus 13 is fitted to the upper end of the tubular body 10. The actuator portion 13 comprises a cap 14 having a tubular side wall and an end wall. The internal diameter of the side wall of the cap 14 is dimensioned to receive the upper end of the tubular body 10, so that the actuator portion 13 can be fitted to the tubular body 10 by sliding on the cap 14 and twisting the cap 14 in one direction to cause a peg 17 on the tubular body 10 to locate into a L-shaped cut out 18 in the sidewall of the cap 14.

The actuator portion 13 further comprises an elongate shaft 15 which extends through the end cap 14 and axially into the tubular body 10. The shaft 15 comprises an enlarged end 19 having a diameter which is dimensioned to be close but sliding fit within the tubular body 10.

The upper end of the shaft 15 is connected via a pair of linked arms 16A, 16B to the end cap 14. In use, it will be appreciated that the shaft 15 can be moved axially of the tubular body 10 by moving the free end of the arm 16A upwardly or downwardly in a direction generally parallel to the longitudinal axis of the body 10.

Figure 3:
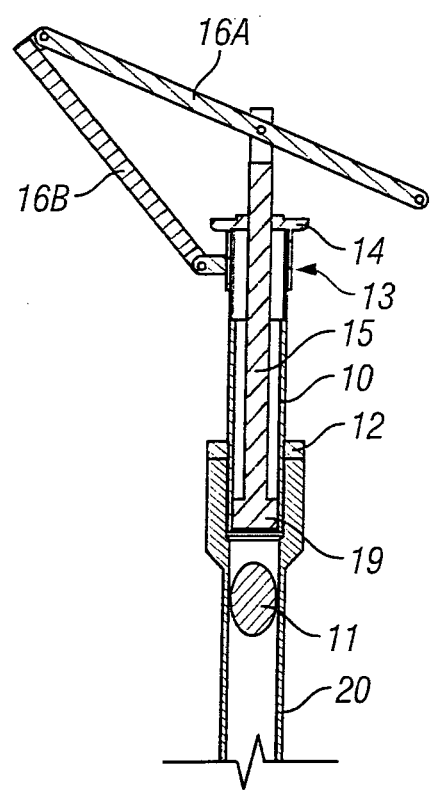
FIG. 3 is a longitudinal sectional view of the apparatus of FIG. 1 when fitted to a drill string following ejection of a cleaning ball.

Referring to FIG. 3 of the drawings, the lower end of the tubular body 10 can then be inserted inside the open upper end of a drill string 20 such that the collar 12 abuts the upper end face thereof. The actuator 13 can either be fitted to the tubular body 10 before or after this step. Once in-situ, a person can pull down on the free end of the arm 16A to cause the shaft 15 to move downwardly, thereby pushing the cleaning ball 11 out of the tubular body 10 into the drill string 20. The cleaning ball 11 can then be forced down the drill string 20 in the conventional manner, so as to clean the latter.

Following use, the actuator 13 can be removed from the body 10, so that another cleaning ball 11 can be inserted into the body 10 for future use: this may be carried out at a location away from the drilling rig by trained personnel. Preferably a plurality of tubular body portions 10 pre-loaded with balls are available to hand at any one time and the actuator 13 can simply be fitted to a tubular body portion 10 when required. A provision of a single actuator portion 3 for fitting to a plurality of tubular body portions 10 saves costs and also saves transportation costs because the actuator portion 13 does not need to be shipped to the remote location for re-loading of the ball 11.

An apparatus in accordance with the present invention is simple and inexpensive in construction, yet allows cleaning balls or other members to be rapidly inserted into a drill string in a safe and convenient manner.

The invention claimed is:

1. A kit of parts comprising a plurality of body portions and a single actuator portion,
    each body portion comprising a tubular side wall, an open lower end adapted to engage a drill string, and a resiliently compressible cleaning member mounted inside a hollow interior thereof under compression,
    the actuator portion being arranged for selectively fitting to said body portions for use in ejecting the cleaning members out of the lower end thereof.

2. A method of cleaning a drill string, the method comprising:
    Providing a body portion having a tubular side wall, a hollow interior, an open lower end adapted to engage the drill string, and a resiliently compressible cleaning member mounted inside the hollow interior thereof under compression;
    fitting an actuator portion to the upper end of the body, the actuator portion comprising an actuator member and a handle connected thereto;
    engaging the lower end of the body portion with the upper end of the drill string, the cleaning member having been compressed into the hollow interior of the body portion prior to the lower end of the body portion being engaged with the upper end of the drill string; and,
    manually actuating the handle to axially displace the actuator member along the hollow interior of the body portion to push the cleaning member out of the lower end of the body portion and into the upper end of the drill string.

3. A method as claimed in claim 2, in which the lower end of the tubular side wall of the body portion is fitted inside the upper end of the drill string.

4. A method as claimed in claim 2, in which the cleaning member is resiliently compressed into the tubular side wall of the body portion at a location remote from the drill string.

5. A method as claimed in claim 4, in which the actuator portion is detached from the body portion after the cleaning member has been ejected from the tubular side wall of the body portion into the drill string.

6. A method of cleaning a drill string, the method comprising:
    providing a plurality of body portions, each body portion having a tubular side wall, a hollow interior and an open lower end adapted. to engage the drill string and pre-loaded with a resiliently compressible cleaning member under compression;
    fitting an actuator portion to an upper end of a first o the plurality of body portions, the first body portion being pre-loaded with a first resiliently compressible cleaning member, and the actuator portion comprising an actuator member and a handle connected thereto;
    engaging the lower end of the first body portion with the upper end of the drill string;
    manually actuating the handle to axially displace the actuator member along the hollow interior of the first body portion to push the first cleaning member out of the lower end of the first body portion into the upper end of the drill string;
    detaching the actuator portion from the first body portion after the first cleaning member has been ejected from the tubular side wall of the first body portion into the drill string;

fitting the actuator portion to an upper end of a second of the plurality of body portions, the second body portion being pre-loaded with a second resiliently compressible cleaning member;

engaging the lower end of the second body portion with the upper end of the drill string;

manually actuating the handle to axially displace the actuator member along the hollow interior of the second body portion to push the second cleaning member out of the lower end of the second body portion into the upper end of the drill string.

\* \* \* \* \*